United States Patent [19]

Chang et al.

[11] Patent Number: 5,071,209
[45] Date of Patent: Dec. 10, 1991

[54] VARIABLE ACUITY NON-LINEAR PROJECTION SYSTEM

[75] Inventors: David B. Chang, Tustin; Norton L. Moise, Pacific Palisades; I-Fu Shih, Los Alamitos, all of Calif.

[73] Assignee: Hughes Aircraft Company, Los Angeles, Calif.

[21] Appl. No.: 519,608

[22] Filed: May 7, 1990

[51] Int. Cl.$^5$ .......................... G02B 5/32; G03H 1/04
[52] U.S. Cl. ...................................... 359/19; 353/13; 353/38; 359/15; 359/30
[58] Field of Search ...................... 350/3.7, 3.72, 3.78, 350/174, 3.83, 3.74; 353/13, 38

[56] References Cited

U.S. PATENT DOCUMENTS

| | | | |
|---|---|---|---|
| 3,600,056 | 8/1971 | King, Jr. | 350/3.78 |
| 3,628,847 | 12/1971 | Bostwick | 350/3.78 |
| 3,656,121 | 4/1972 | Rajchman et al. | 350/3.78 |
| 3,744,871 | 7/1973 | Takeda et al. | 350/3.78 |
| 3,767,285 | 10/1973 | Mezrich | 350/3.78 |
| 4,329,019 | 5/1982 | Okoshi et al. | 350/3.72 |
| 4,500,163 | 2/1985 | Burns et al. | 350/3.7 |
| 4,810,047 | 3/1989 | Pernick | 350/3.72 |
| 4,818,045 | 4/1989 | Chang | 350/174 |
| 4,978,182 | 12/1990 | Tedesco | 350/3.7 |
| 4,988,151 | 1/1991 | Moss | 350/3.66 |

FOREIGN PATENT DOCUMENTS 2850574 6/1979 Fed. Rep. of Germany ..... 350/3.72

Primary Examiner—Bruce Y. Arnold
Assistant Examiner—Martin Lerner
Attorney, Agent, or Firm—Michael W. Sales; Wanda K. Denson-Low

[57] ABSTRACT

The invention provides a non-linear projection system, which includes a variable acuity non-linear holographic optical element (HOE), and an apparatus for creating the HOE. The projection system comprises a computer, a light valve which projects images generated by the computer, a lens train for focusing the images projected by the light valve, an HOE for the non-linear refraction of the focused images and a hemispherical viewing screen. The system additionally provides means for maintaining the center of the projected images in alignment with center of the field of view of an observer. The variation of the pixel size and spacing created by the system matches the variation of the human visual acuity of the observer permitting a realistic view to be presented while requiring a minimum of computer data to be generated and projected. The apparatus for creating the HOE utilizes a laser beam, three lens trains and a holographic recording medium. A procedure for utilizing the apparatus to record the HOE over a large portion of its surface area is also disclosed.

14 Claims, 2 Drawing Sheets

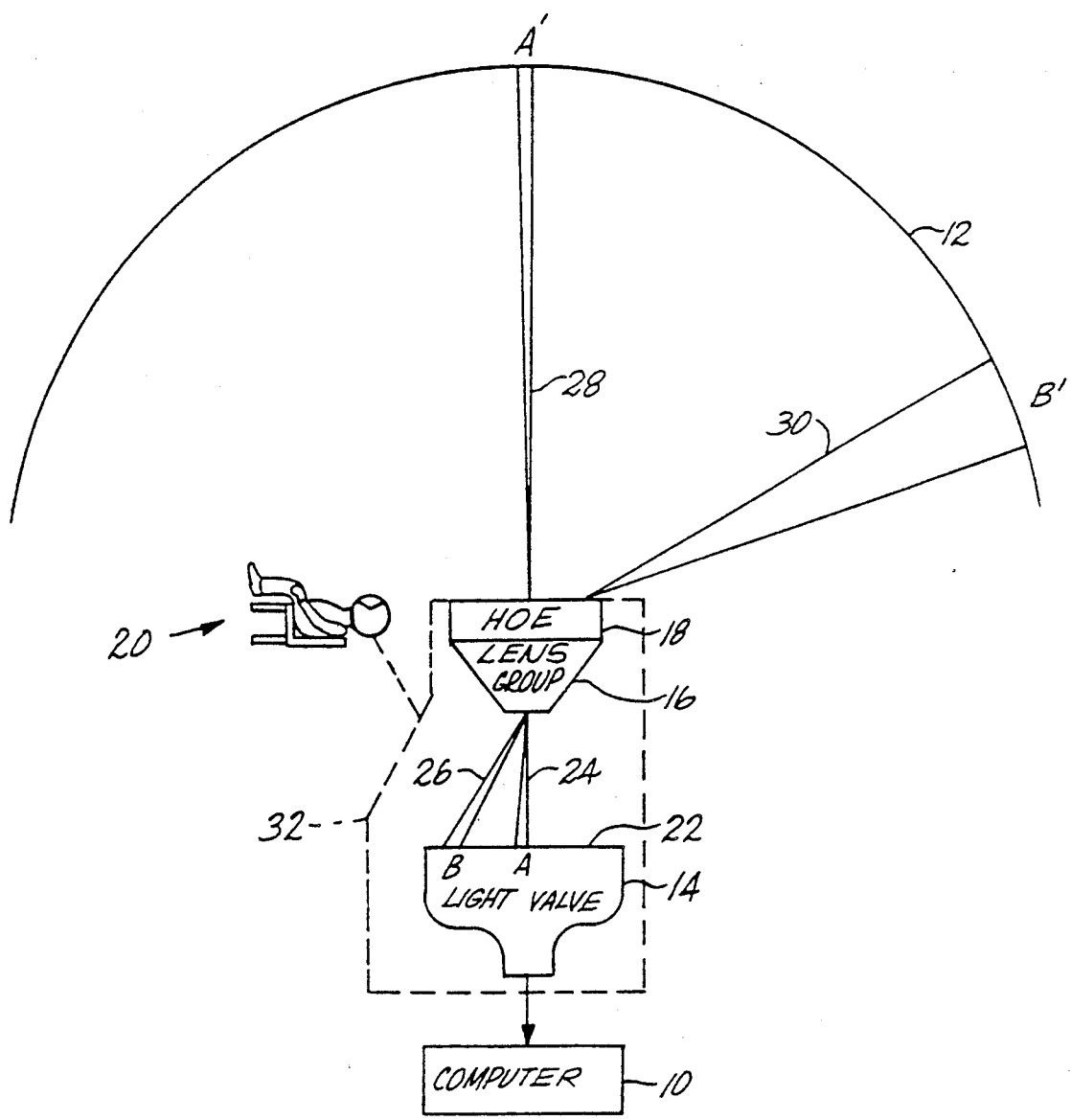

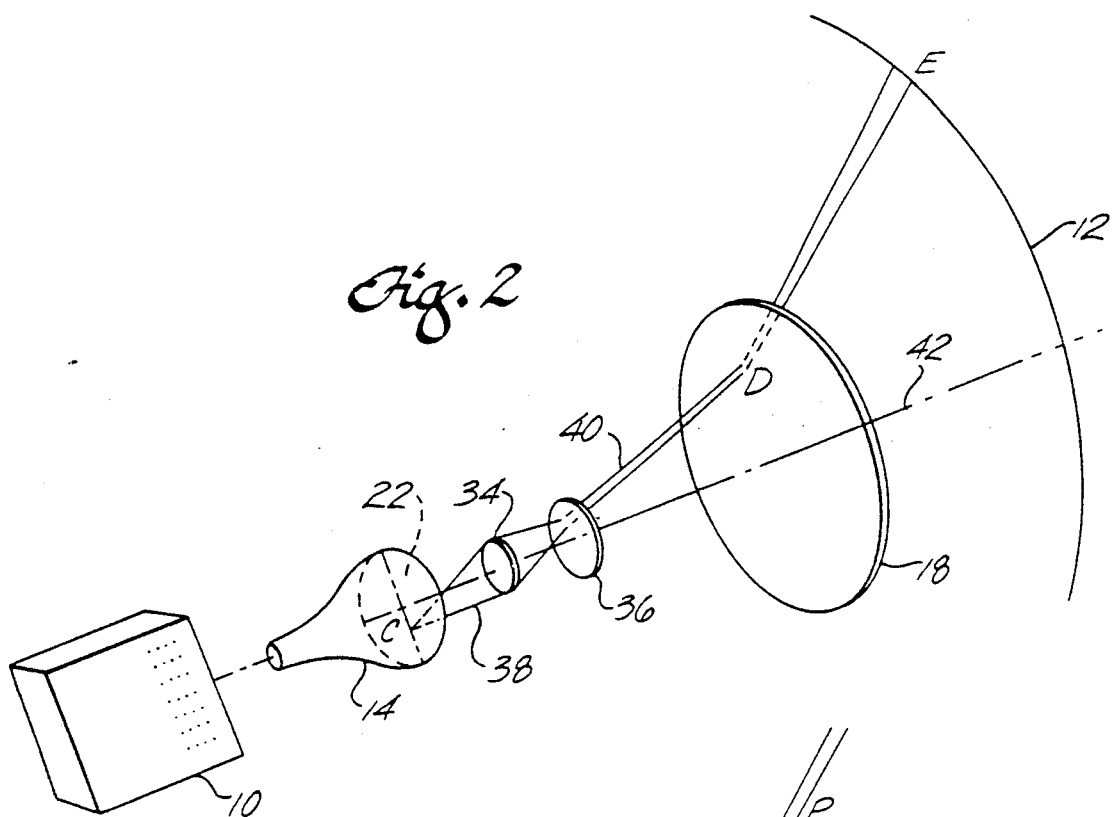
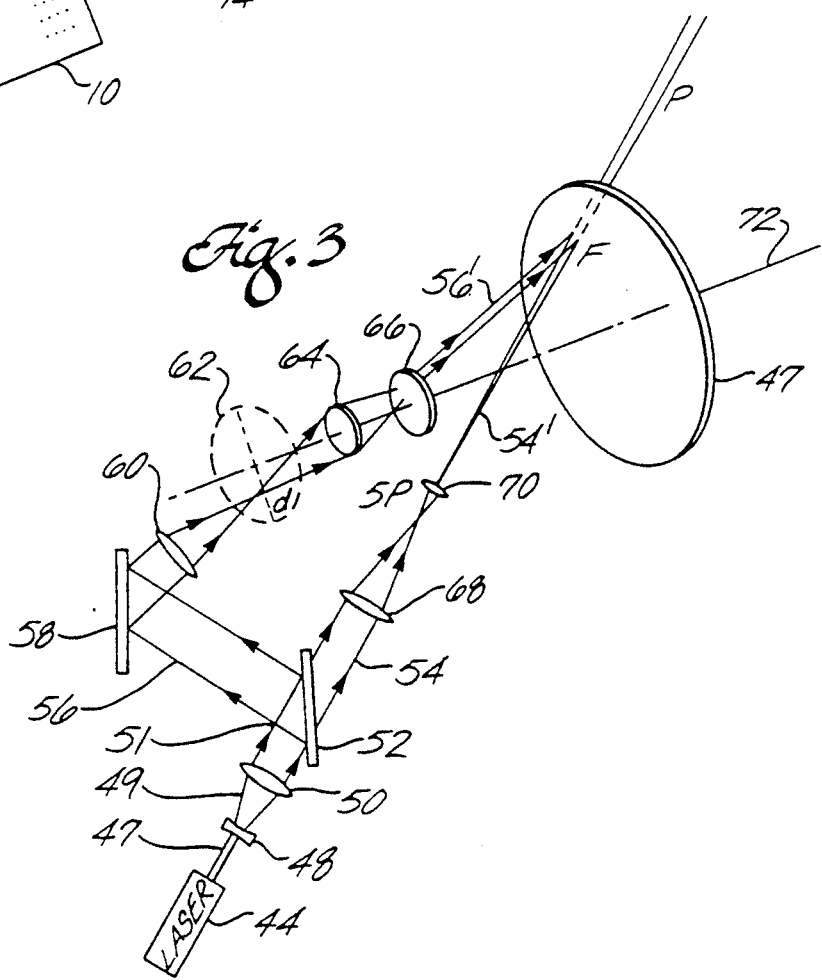

VARIABLE ACUITY NON-LINEAR PROJECTION SYSTEM

FIELD OF THE INVENTION

The present invention relates generally to the field of image projection and in particular to the projection of non-linear images.

BACKGROUND OF THE INVENTION

Flight trainers and other computer controlled simulators are currently capable of providing the illusion of traveling across a computer generated landscape. Such simulators, however, are limited by the amount of image data which can practically be presented in a real time simulation. This limitation forces a reduction from that desired in either the field of view of the simulation or the resolution of the images presented. An optimal simulation display would have a field of view of 180° and a resolution of at least one minute of arc. This goal is difficult to achieve, however, because such a display would require approximately 60 million picture elements or pixels. A one thousand line television picture generates about 500,000 pixels. Thus, the equivalent of approximately 100 television monitors would be required to generate an optimum simulator display. As the total cost of such a system would be unacceptable, alternative approaches have been utilized.

One of the more promising approaches takes advantage of the nature of human vision. The eye breaks its visual field into areas of acuity, the angular resolution of which decrease as the view angle increases from the foveal axis of the eye. A 180° computer generated simulator display that similarly decreased the amount of information contained in the image towards its edges, that is, reduced the number of pixels of the image in proportion to the pixels' distance from the center of the display, would be able to significantly reduce the total number of pixels needed for the display. A 180° display having such a variable resolution, one matching the variable acuity of the eye, would require only approximately 200,000 pixels. This number of pixels could easily be generated by a 1,000 line TV or currently available computer systems.

Such a variable acuity display system requires a non-linear lens for the proper projection of the images onto a screen. The preferred screen for such a system is hemispherical in shape, providing a 180° field of view. The focal length of a suitable non-linear lens varies by its field angle with the same function as eye acuity. Such a lens projects variable sized pixels onto the screen which provides full support of human vision. The variable sized pixels projected provide an image having a high resolution in the center of the viewing area (on the optical axis) and lower resolutions moving away from the center of the viewing area (away from the optical axes). In order to maintain the high resolution of the optical axis of the system in alignment with the foveal axis of the viewer's eye, the non-linear lens system is mechanically rotated in two axes in synchronization with the eye movements of the viewer.

Existing variable acuity non-linear lenses are comprised of multiple aspherical and simple lenses. The number and type of lenses required make current non-linear lenses are costly, difficult to manufacture and relatively heavy. The greater the weight of the lens the more difficult it becomes to rotate the lens to maintain alignment between the visual axis of the projected images and the foveal axis of the viewer's eye.

An improved variable acuity non-linear system and lens is needed, wherein the lens is lightweight, simple in form, and inexpensive to produce.

SUMMARY OF THE INVENTION

The present invention provides a variable acuity non-linear holographic optical element (HOE) for use with a computer generated visual display system. The HOE is used with a system which can fully satisfy the human visual acuity over a 180° field-of-view. The HOE, when used in conjunction with a computer image generator, provides distortion in an image projected to the interior of a hemispherical screen such that equal-size and equally spaced pixels on a light valve surface are projected as differently sized pixels with variable spacing on the screen. The variation of the pixel size and spacing matches the variation of human visual acuity permitting a realistic view to be presented to an observer while requiring a minimum of computer data to be generated and projected.

The invention comprises a variable acuity non-linear projection system which utilizes an HOE and an apparatus for creating the HOE. The projection system, designed for use by an observer having a predetermined field of view, comprises a computer, a light valve, means for focusing images projected by the light valve, a viewing screen and an HOE for the non-linear diffraction of the focused images on the screen.

The computer is programmed to create images having a multiplicity of pixels. The portion of the image in each pixel is increased by a predetermined amount in proportion to the distance of the pixel from the center of the image. The light valve is connected to the computer and projects the images created by the computer. The projected images are focused to bundles of light rays having a predetermined cross-section. The focusing is accomplished by a positive lens which converges the light ray bundles a predetermined amount and a negative lens which then collimates the converged light ray bundles to the desired cross-section. The viewing screen comprises at least a segment of a hemisphere and receives and reflects the projected images. The HOE is placed between the negative lens and the screen. The HOE redirects and expands each ray bundle by a predetermined amount, the amount increasing in proportion to the distance of the light ray bundle from the center of the image. Each pixel of the projected image is likewise expanded in proportion to its distance from the center of the image.

The system additionally provides means for maintaining the center of the projected images in alignment with center of the field of view of the observer.

Another aspect of the invention includes an apparatus for creating the HOE utilizing a holographic recording medium and a laser beam directed towards the medium. The apparatus comprises a negative lens placed in the path of the laser beam such that the lens spreads the cross-section of the beam. A positive lens is placed in the path of the beam issuing from the negative lens collimating the beam to a predetermined size. A beam splitter is placed in the path of the collimated beam such that a portion of the beam passes through the beam splitter and continues towards the holographic recording medium as a reference beam, and a portion of the beam is directed away from the holographic recording medium as an objective beam. A reflective device, such as a mirror or prism, directs the objective beam towards a point on the holographic recording medium substantially coincident with the reference beam. The objective beam is converged to a focal point located between the beam splitter and the holographic recording medium by a second positive lens placed in the path of the beam reflecting from the mirror such that the beam is focused to a point having a diameter corresponding to one pixel of a variable acuity image at the point of intersection of the beam with the objective plane. The beam is inverted after emerging from the focal point. After passing through the objective plane, the beam is caused to impinge on the holographic recording medium with a cross-section of a predetermined size. This size is controlled by a third positive lens which causes the beam to be converged by a preselected amount, and a second negative lens which collimates the beam to the preselected cross-section.

The reference beam emerging from the beam splitter is caused to impinge on the holographic recording medium with a cross-section of substantially the same size as that of the objective beam. This size is controlled by a fourth positive lens placed in the path of the reference beam converging the beam to a focal point and inverting the beam. A fifth positive lens placed in the path of the beam emerging from the focal point such that the beam is diverged to a cross-section substantially the same as that of the objective beam at the point of the impingement of the beams on the holographic recording medium.

The interaction of the beams creates a grating structure on the holographic recording medium which will diffract one pixel of an image projected on the holographic medium a predetermined amount. Means are provided for impinging the substantially coincident objective and reference beams on a multiplicity of points on the holographic recording medium.

The foregoing and other advantageous and distinguishing features of the invention are described in detail below and are recited in the appended claims.

BRIEF DESCRIPTION OF THE DRAWINGS

FIG. 1 is a block diagram of a variable acuity non-linear projecting system incorporating features of the present invention, showing the projection paths of two light ray bundles;

FIG. 2 is a schematic representation of the system shown in FIG. 1, depicting the passage of a single light ray bundle through a lens group and a variable acuity non-linear lens; and FIG. 3 is a schematic representation of another aspect of the invention, the apparatus used to create the variable acuity non-linear lens shown in FIG. 1.

DETAILED DESCRIPTION

The present invention provides an HOE lens and a system which creates and projects images matching the variation of human visual acuity over a 180° field of view. Such a system is shown in FIG. 1. A computer 10 is programmed to create images which will be displayed on a hemispherical observation screen 12. The screen may comprise the interior of a viewing dome or a desired portion of a hemispherical figure. The computer 10 is programmed to create images comprised of pixels. The pixels are of a uniform shape and size and each contains a fixed amount of visual information. The portion of each image, represented by the visual information within each pixel, increases proportionally with the distance of the pixel from the center of the image. Thus the image created by the computer is normal in its center and compressed towards its edges. The function of the remainder of the elements of the system is to display and decompress the compressed pixels in the proper amount such that the final images viewed by an observer 20 appear normal. The amount of visual information contained within each pixel is fixed. Thus the resolution at the center of a displayed image is normal and decreases towards its edges.

The images are projected by a light valve 14, a lens group 16 and a variable acuity non-linear holographic optical element (HOE) 18. The light valve receives a computer generated image and projects it into the lens group. The lens group forms the projected image into collimated light ray bundles which strike the HOE. The HOE bends the light ray bundles redirecting them and causing their expansion as they travel towards the screen 12. The amount of redirection and expansion imparted by the HOE increases by a predetermined amount in proportion to the distance from its center each light ray bundle strikes the HOE. The light ray bundles are collectively reflected from the screen to form the images seen by the observer 20.

The function of the system is illustrated for two pixels A, B displayed and projected by the light valve 14. The imaging of the pixels on the projecting surface of the light valve may be considered to result in the creation of first and second light ray bundles 24, 26 created by pixels A and B, respectively. The light ray bundles 24, 26 are reduced to collimated beams of light having predetermined cross sections. The beams of collimated light strike the HOE 18 which refracts the beams towards the. Screen. Pixel A is located in the center of the light valve, thus the first beam 28 is minimally redirected resulting in a pixel A' being formed on the screen 12 having a relatively small size. Pixel B is located towards one edge of the light valve, thus the second beam 30 is redirected and expanded to a greater degree to create a pixel B' on the screen having a relatively large size.

As the total amount of visual information contained within the pixel A' is the same as that pixel B', the image in the pixel A' will appear to the observer to have a higher resolution than the image in pixel B'. However, so long as the foveal axis of the observer's eye is directed towards A', the reduced resolution of the image in pixel B' will be matched by the reduced acuity of the observer's eye making the reduced resolution of B' unnoticeable. Means 32 are provided to maintain the highest resolution portion of the projected image in alignment with the foveal axis of the observer's eye. Means 32 senses the direction of the field of view of the observer and rotates the light valve 14, lens group 16 and HOE 18, as required, to maintain this alignment.

The lens group 16 is shown in greater detail in FIG. 2. The lens group comprises a positive lens or lens group 34 and a negative lens or lens group 36. The positive lens 34 converges light rays 38 emanating from the projecting surface 22 of the light valve. The negative lens 36 is placed in the path of the converging light rays 38 at a location where the rays have a predetermined cross section. The negative lens 36 collimates the light rays to this cross section 40. For example, the relative portion of a diverging light ray bundle 38 projecting from a pixel C on the projecting surface 22 will strike the positive lens 34. After passing through the positive lens the light ray bundle converges. At the location where the cross section of the converging light ray bundle is that which is desired, negative lens 36 refracts the light ray bundle towards the HOE 18 as a collimated beam 40 having the desired cross section. The collimated beam strikes the HOE which diffracts and expands the beam a predetermined amount based on the distance the beam strikes the HOE away from a center line 42. The HOE, the light valve 14, the positive lens 34 and the negative lens 36 are all preferably aligned on a common center line 42. The beam then strikes the screen 12 and is reflected as a part E of a total projected image.

As the pixels are projected from distances further from the center line 42 of the light valve 14, the resulting collimated beams strike the HOE a distance proportionally further away from the center line 42 of the HOE, and the HOE diffracts the collimated beams a proportionally greater amount away from the center line 42 of the viewing screen. The HOE additionally expands the collimated beams by a similarly proportionally greater amount.

The present invention may be used as a flight simulator with the addition of the necessary equipment to comprise a simulated pilot's position, and appropriate software enabling the computer to create flight images providing the appearance of a view from the cockpit of the aircraft simulated. Other simulations may be accomplished by providing the appropriate simulated operators station and the software to create images associated with the activity simulated.

Another aspect of the invention provides an apparatus for producing the HOE. Referring now to FIG. 3, the apparatus comprises an optical arrangement designed to record a holographic optical element for non-linear projection of an object plane 62. The object plane is comprised of uniform pixels which represent the variable acuity image. For the embodiment shown, the object plane is circular, having a central axis of symmetry corresponding to the axis of symmetry 42 of the HOE to be recorded. The optical arrangement includes a laser source 44, a first negative lens 48 to spread the laser beam, a first positive lens 50 to collimate the laser beam, a beam splitter 52 inserted in the collimated beam to form a reference beam 54 and an object beam 56. The beam splitter 52, which may comprise a half silvered mirror or other appropriate partially transmissive, partially reflective device, is placed into the collimated beam 51 to split the beam.

The object beam is directed by appropriate reflecting means 58 to a second positive lens 60. Lens 60 is positioned to focus the object beam such that the inverted expanding object beam has the diameter of one pixel at the intersection of the beam with the object plane. The pixel location of the beam is determined by the offset from the axis of symmetry of the object plane. The object beam is then passed through a positive lens group 64 and a negative lens group 66 to create a collimated pencil object beam 56′. In this embodiment, the object beam optical train, lenses 60, 64 and 66, is oriented such that the collimated pencil object beam impinges the HOE recording medium 47 at a distance from the axis of symmetry corresponding to the distance of the pixel in the object plane from the axis of symmetry of the object plane.

The reference beam 54 passes through a positive lens 68 for focusing. The inverted reference beam emerging from the focal point of lens 68 passes through a positive lens 70. Lens 70 is a controllable optical element operating on the reference beam to provide a slightly diverging beam 54′ which impinges on the HOE recording medium approximately coincident with the collimated pencil object beam. In the present embodiment lens 70 is a positive lens.

By adjusting the position of lens 70 along the optical axis of the reference optical train, a proper beam divergence can be achieved. Lens 70 is positioned relative to the focus of the reference beam such that the diameter of the reference beam 54′ where the beam impinges the HOE recording medium is equal to the diameter of the object beam 56′. In one embodiment, this is accomplished by keeping the distance between lens 68 and lens 70 constant while adjusting the positions of lenses 68 and 70 together along the optical axis to obtain equal beam diameter of the slightly diverging reference beam 54′ and the collimated pencil object beam 56′ on the HOE recording medium. The angle of divergence of the reference beam 54′ is controlled by lens 70 to be proportional to the distance from the axis of symmetry of the object plane of the pixel represented by the object beam.

The angular relationship between the reference beam optical train and the object beam optical train to result in a projected beam at a given angle is well known in the art of holographic recording. The divergence of the reference beam results in a divergence of the projected beam.

The cross sections of the two beams are substantially the same size and are simultaneously impinged on the recording medium for a predetermined length of time. The recording medium 47 is exposed by the beams, creating a grating structure on the medium. After development of the medium, the area exposed by the beams, when used with the variable acuity non-linear projecting system of the present invention, will diffract one pixel of a variable acuity image, redirecting and expanding the pixel a predetermined amount.

By changing the location on the recording medium 47 at which the objective and reference beams substantially coincidentally impinge, a multiplicity of points on the medium may be exposed. As the amount of diffraction desired by the recording medium, after development, is the same for distances equal from the center line 72 of the medium, a particular setting of the optical trains may be used to expose a ring shaped area on the medium by rotating the medium about its center line. By this method the total number of alignments of the optical trains necessary to expose substantially all of the recording medium is significantly reduced.

After the recording medium 47 fully exposed, it may be developed by methods well known in the art. The recording medium material to be used, the length of time for each exposure, and the techniques for setting up and altering the optical trains depicted in FIG. 3, are also well known in the art and standard practices may be used to create the HOE of the present invention with the optical trains described above.

In view of the foregoing description of the invention, those skilled in the relevant arts will have no difficulties making changes and modifications in the different described elements of the invention in order to meet their specific requirements or conditions. Such changes and modifications may be made without departing from the scope and spirit of the invention as set forth in the following claims.

What is claimed is:

1. An image projection system for use by an observer having a predetermined field of view, the system comprising:
    means for creating and projecting images about a center such that the resolution of the images decreases the farther the image is located from the center;
    means for focusing the projected images to bundles of light rays having predetermined cross-section;
    a viewing screen;
    a transmissive holographic optical element non-linearly diffracting the light ray bundles from the focusing means to the viewing screen such that the resolution of the images in the bundles increases the farther the image is located from the center; and
    means for maintaining the center of the images in alignment with the center of the field of view of the observer.

2. The system of claim 1 wherein the means for creating the images comprises:
    a computer programmed to create images comprised of a multiplicity of pixels, the portion of the totality of the images contained in each pixel increasing by a predetermined amount in proportion to the distance of the pixel from the center of the image; and
    a light valve connected to the computer to project the images created by the computer.

3. The system of claim 1 wherein the means for focusing the images comprises;
    a positive lens which converges the light ray bundles a predetermined amount; and
    a negative lens which collimates the converged light ray bundles from the positive lens to a cross-section of a predetermined size.

4. The system of claim 1 wherein the transmissive holographic optical element redirects and expands the image in each ray bundle received from the focusing means by a predetermined amount which increases in proportion to the distance of the light ray bundle from the center of the images.

5. An apparatus for producing a holographic optical element from a holographic recording medium, the apparatus comprising:
    a source for producing a coherent light beam;
    means for collimating and splitting the coherent light beam into a reference beam and an objective beam;
    means for directing the objective beam towards a point on the holographic recording medium substantially coincident with the reference beam;
    means for converging the objective beam to a focal point within an objective plane located between the beam splitting means and the holographic recording medium, the point in the objective plane representing one pixel of a variable acuity image;
    means for causing the objective beam, after passing through the objective plane, to impinge on the holographic recording medium for a predetermined length of time and to have a cross-section of a predetermined size;
    means for causing the reference beam to diverge and impinge on the holographic recording medium for a predetermined length of time, the reference beam substantially coincident with the objective beam and having a cross-section of substantially the same size as that of the objective beam, thereby exposing the recording medium and creating a grating structure on the medium which will diffract an image projected on the holographic recording medium a predetermined amount; and
    means for impinging the substantially coincident objective and reference beams on a multiplicity of areas on the holographic recording medium about the center of the medium, each for a predetermined length of time, thereby exposing a substantial portion of the recording medium to provide a plurality of diffracting areas, said areas for increasing the resolution of the images the farther the image is located from an image center.

6. The apparatus of claim 5 wherein the means for collimating and splitting the coherent light into an objective beam and a reference beam comprises:
    a first negative lens placed in the path of the coherent light beam such that the lens diverges the beam;
    a first positive lens placed in the path of the diverging beam issuing from the first negative lens to collimate the beam to a predetermined cross-section; and
    a beam splitter placed in the path of the collimated beam such that a portion of the beam passes through the beam splitter and a portion is reflected from a surface of the beam splitter.

7. The apparatus of claim 5 wherein the means for directing the objective beam towards a point on the holographic recording medium substantially coincident with reference beam is a reflective device.

8. The apparatus of claim 5 wherein the means for converging the objective beam to a focal point within an objective plane comprises a second positive lens placed in the path of the beam such that the beam is converged to a focal point having a diameter corresponding to one pixel of a variable acuity image at the point of intersection of the beam with the objective plane; the beam being inverted after emerging from the focal point.

9. The apparatus of claim 5 wherein the means for causing the objective beam to impinge on the recording medium comprises:
    a third positive lens placed in the path of the beam extending through the objective plane such that the beam is diverged by a preselected amount; and
    a second negative lens placed in path of the beam issuing from the third positive lens which collimates the beam to a preselected cross-section.

10. The apparatus of claim 5 wherein the means for causing the reference beam to diverge and impinge on the holographic recording medium comprises:
    a fourth positive lens placed in the path of the reference beam such that the beam is converged to a focal point, and inverted after emerging from the focal point; and
    a fifth positive lens placed in the path of the beam emerging from the focal point to cause the beam to diverge at an angle proportional to the location of the object beam on the recording medium relative to a central axis of the medium, the fourth and fifth positive lenses positioned in combination to cause the reference beam to have a cross-section substantially the same as that of the objective beam impinging on the holographic recording medium.

11. A method for producing a holographic optical element comprising:
    providing a source for producing a coherent light beam and a holographic recording medium;
    collimating and splitting the coherent light into a reference beam and an objective beam;

directing the objective beam towards a point on the holographic recording medium;

converging the objective beam to a focal point within an objective plane located between the beam splitting means and the holographic recording medium, the focal point in the objective plane representing one pixel of a variable acuity image;

causing the objective beam, after passing through the objective plane, to impinge with a cross-section of a predetermined size on the holographic recording medium for a predetermined length of time;

causing the reference beam to diverge and impinge with a cross-section of substantially the same size as that of the objective beam on the holographic recording medium for a predetermined length of time, thereby exposing the recording medium and creating a grating structure on the medium which will diffract one pixel of an image projected on the holographic recording medium a predetermined amount;

means for impinging the substantially coincident objective and reference beams on a multiplicity of points on the holographic recording medium, each for a predetermined length of time, thereby exposing a substantial portion of the recording medium to provide a plurality of diffracting points about an image center such that the diffracting points provide increasing resolution for an image the farther a point is located from the center; and developing the holographic recording medium.

12. A method as defined in claim 11 wherein the divergence of the reference beam is proportional to the distance from a central axis of the holographic medium.

13. A flight simulator viewing system comprising:
a pilot's position;
means for creating and projecting images to simulate a view from the pilot's position, each image being compressed an increasing amount the farther the image is located from an image center;
means for focusing the projected images to bundles of light rays having a predetermined cross-section;
a viewing screen; and
a transmissive holographic optical element for diffracting the images in the light ray bundles from the focusing means to the viewing screen to decompress each image an increasing amount the farther the image is located from the image center.

14. A holographic optical element for refracting images received from a projection system comprising:
a holographic medium having a center and a plurality of refraction areas about the center, each area for diffracting an image a predetermined amount such that the resolution of the images areas from the center of the element to its periphery is inverse to the resolution of the images as received from the projection system.

* * * * *